(12) United States Patent
Henry et al.

(10) Patent No.: US 8,358,082 B2
(45) Date of Patent: Jan. 22, 2013

(54) STRIKING AND OPEN LAMP REGULATION FOR CCFL CONTROLLER

(75) Inventors: George C. Henry, Somis, CA (US); David K Lacombe, Mission Viejo, CA (US)

(73) Assignee: Microsemi Corporation, Irvine, CA (US)

( * ) Notice: Subject to any disclaimer, the term of this patent is extended or adjusted under 35 U.S.C. 154(b) by 742 days.

(21) Appl. No.: 12/501,700

(22) Filed: Jul. 13, 2009

(65) Prior Publication Data

US 2009/0273295 A1 Nov. 5, 2009

Related U.S. Application Data

(63) Continuation of application No. 11/773,611, filed on Jul. 5, 2007, now Pat. No. 7,569,998.

(60) Provisional application No. 60/806,714, filed on Jul. 6, 2006, provisional application No. 60/849,211, filed on Oct. 4, 2006, provisional application No. 60/849,254, filed on Oct. 4, 2006.

(51) Int. Cl.
    *H05B 41/16* (2006.01)
(52) U.S. Cl. ............... 315/247; 315/209 R; 315/224; 315/278; 315/291
(58) Field of Classification Search .......... 315/247, 315/224, 225, 291, 307–311, 185 S
    See application file for complete search history.

(56) References Cited

U.S. PATENT DOCUMENTS

| | | | |
|---|---|---|---|
| 2,429,162 A | 10/1947 | Russell et al. | |
| 2,440,984 A | 5/1948 | Summers | |
| 2,572,258 A | 10/1951 | Goldfield et al. | |
| 2,965,799 A | 12/1960 | Brooks et al. | |
| 2,968,028 A | 1/1961 | Eilichi et al. | |
| 3,141,112 A | 7/1964 | Eppert | |
| 3,449,629 A | 6/1969 | Wigert et al. | |
| 3,565,806 A | 2/1971 | Ross | |
| 3,597,656 A | 8/1971 | Douglas | |
| 3,611,021 A | 10/1971 | Wallace | |
| 3,683,923 A | 8/1972 | Anderson | |
| 3,737,755 A | 6/1973 | Calkin et al. | |
| 3,742,330 A | 6/1973 | Hodges et al. | |
| 3,916,283 A | 10/1975 | Burrows | |
| 3,936,696 A | 2/1976 | Gray | |
| 3,944,888 A | 3/1976 | Clark | |
| 4,053,813 A | 10/1977 | Komrumpf et al. | |
| 4,060,751 A | 11/1977 | Anderson | |

(Continued)

FOREIGN PATENT DOCUMENTS

| EP | 0326114 | 8/1989 |
|---|---|---|
| EP | 0587923 | 3/1994 |

(Continued)

OTHER PUBLICATIONS

Bradley, D.A., "Power Electronics" 2nd Edition; Chapman & Hall, 1995; Chapter 1, pp. 1-38.

(Continued)

*Primary Examiner* — Tuyet Thi Vo
(74) *Attorney, Agent, or Firm* — Knobbe Martens Olson & Bear, LLP

(57) ABSTRACT

An apparatus and method for igniting a lamp during a strike mode of an inverter comprising: sequentially controlling a duty cycle sweep and a frequency sweep of driving signals in the inverter to provide an increasing output voltage to the lamp. One embodiment advantageously includes a closed feedback loop to implement the duty cycle sweep and the frequency sweep such that an open lamp voltage is reliably regulated during the strike mode. For example, the closed feedback loop stops the duty cycle sweep or the frequency sweep when the output voltage to the lamp reaches a predetermined threshold and makes adjustments to the duty cycle or frequency the driving signals as needed to keep the output voltage at approximately the predetermined threshold if the lamp has not ignited.

7 Claims, 5 Drawing Sheets

U.S. PATENT DOCUMENTS

| | | |
|---|---|---|
| 4,194,147 A | 3/1980 | Payne et al. |
| 4,204,141 A | 5/1980 | Nuver |
| 4,257,090 A | 3/1981 | Kröger et al. |
| 4,276,590 A | 6/1981 | Hansel et al. |
| 4,277,728 A | 7/1981 | Stevens |
| 4,307,441 A | 12/1981 | Bello |
| 4,353,009 A | 10/1982 | Knoll |
| 4,359,679 A | 11/1982 | Regan |
| 4,386,394 A | 5/1983 | Kocher et al. |
| 4,388,562 A | 6/1983 | Josephson |
| 4,392,087 A | 7/1983 | Zansky |
| 4,425,613 A | 1/1984 | Shelly |
| 4,437,042 A | 3/1984 | Morais et al. |
| 4,441,054 A | 4/1984 | Bay |
| 4,463,287 A | 7/1984 | Pitel |
| 4,469,988 A | 9/1984 | Cronin |
| 4,480,201 A | 10/1984 | Jaeschke |
| 4,523,130 A | 6/1985 | Pitel |
| 4,543,522 A | 9/1985 | Moreau |
| 4,544,863 A | 10/1985 | Hashimoto |
| 4,555,673 A | 11/1985 | Huijsing et al. |
| 4,562,338 A | 12/1985 | Okami |
| 4,567,379 A | 1/1986 | Corey et al. |
| 4,572,992 A | 2/1986 | Masaki |
| 4,574,222 A | 3/1986 | Anderson |
| 4,585,974 A | 4/1986 | Stupp et al. |
| 4,618,779 A | 10/1986 | Wiscombe |
| 4,622,496 A | 11/1986 | Dattilo et al. |
| 4,626,770 A | 12/1986 | Price, Jr. |
| 4,630,005 A | 12/1986 | Clegg et al. |
| 4,635,178 A | 1/1987 | Greenhalgh |
| 4,663,566 A | 5/1987 | Nagano |
| 4,663,570 A | 5/1987 | Luchaco et al. |
| 4,672,300 A | 6/1987 | Harper |
| 4,675,574 A | 6/1987 | Delflache |
| 4,682,080 A | 7/1987 | Ogawa et al. |
| 4,686,615 A | 8/1987 | Ferguson |
| 4,689,802 A | 8/1987 | McCambridge |
| 4,698,554 A | 10/1987 | Stupp et al. |
| 4,698,738 A | 10/1987 | Miller et al. |
| 4,700,113 A | 10/1987 | Stupp et al. |
| 4,717,833 A | 1/1988 | Small |
| 4,717,863 A | 1/1988 | Zeiler |
| 4,724,374 A | 2/1988 | Beg |
| 4,729,086 A | 3/1988 | Lethellier |
| 4,734,844 A | 3/1988 | Rhoads |
| 4,745,339 A | 5/1988 | Izawa et al. |
| 4,761,722 A | 8/1988 | Pruitt |
| 4,766,353 A | 8/1988 | Burgess |
| 4,779,037 A | 10/1988 | LoCascio |
| 4,780,696 A | 10/1988 | Jirka |
| 4,792,747 A | 12/1988 | Schroeder |
| 4,812,781 A | 3/1989 | Regnier |
| 4,825,144 A | 4/1989 | Alberkrack et al. |
| 4,847,745 A | 7/1989 | Shekhawat et al. |
| 4,862,059 A | 8/1989 | Tominaga et al. |
| 4,885,486 A | 12/1989 | Shekhawat et al. |
| 4,893,069 A | 1/1990 | Harada et al. |
| 4,902,942 A | 2/1990 | El-Hamamsy |
| 4,924,170 A | 5/1990 | Henze |
| 4,939,381 A | 7/1990 | Shibata |
| 4,998,046 A | 3/1991 | Lester |
| 5,023,519 A | 6/1991 | Jensen |
| 5,030,887 A | 7/1991 | Guisinger |
| 5,036,255 A | 7/1991 | McKnight et al. |
| 5,036,452 A | 7/1991 | Loftus |
| 5,049,790 A | 9/1991 | Herfurth et al. |
| 5,057,719 A | 10/1991 | Niedra |
| 5,057,808 A | 10/1991 | Dhyanchand |
| 5,077,486 A | 12/1991 | Marson et al. |
| 5,083,065 A | 1/1992 | Sakata et al. |
| 5,089,748 A | 2/1992 | Ihms |
| 5,105,127 A | 4/1992 | Lavaud et al. |
| 5,130,565 A | 7/1992 | Girmay |
| 5,130,635 A | 7/1992 | Kase |
| 5,157,269 A | 10/1992 | Jordan et al. |
| 5,164,890 A | 11/1992 | Nakagawa et al. |
| 5,173,643 A | 12/1992 | Sullivan et al. |
| 5,200,643 A | 4/1993 | Brown |
| 5,220,272 A | 6/1993 | Nelson |
| 5,235,254 A | 8/1993 | Ho |
| 5,266,838 A | 11/1993 | Gerner |
| 5,285,148 A | 2/1994 | Uhlenhoff et al. |
| 5,289,051 A | 2/1994 | Zitta |
| 5,317,401 A | 5/1994 | Dupont et al. |
| 5,327,028 A | 7/1994 | Yum et al. |
| 5,349,272 A | 9/1994 | Rector |
| 5,351,180 A | 9/1994 | Brennen et al. |
| 5,406,305 A | 4/1995 | Shimomura et al. |
| 5,410,221 A | 4/1995 | Mattas et al. |
| 5,420,779 A | 5/1995 | Payne |
| 5,428,523 A | 6/1995 | McDonnal |
| 5,430,641 A | 7/1995 | Kates |
| 5,434,477 A | 7/1995 | Crouse et al. |
| 5,440,208 A | 8/1995 | Uskali et al. |
| 5,463,287 A | 10/1995 | Kurihara et al. |
| 5,471,130 A | 11/1995 | Agiman |
| 5,475,284 A | 12/1995 | Lester et al. |
| 5,475,285 A | 12/1995 | Konopka |
| 5,479,337 A | 12/1995 | Voigt |
| 5,485,057 A | 1/1996 | Smallwood et al. |
| 5,485,059 A | 1/1996 | Yamashita et al. |
| 5,485,487 A | 1/1996 | Orbach et al. |
| 5,493,183 A | 2/1996 | Kimball |
| 5,495,405 A | 2/1996 | Fujimura et al. |
| 5,510,974 A | 4/1996 | Gu et al. |
| 5,514,947 A | 5/1996 | Berg |
| 5,519,289 A | 5/1996 | Katyl et al. |
| 5,528,192 A | 6/1996 | Agiman |
| 5,539,281 A | 7/1996 | Shackle et al. |
| 5,546,298 A | 8/1996 | Rohner |
| 5,546,299 A | 8/1996 | Lenz |
| 5,548,189 A | 8/1996 | Williams |
| 5,552,697 A | 9/1996 | Chan |
| 5,557,249 A | 9/1996 | Reynal |
| 5,563,473 A | 10/1996 | Mattas et al. |
| 5,563,501 A | 10/1996 | Chan |
| 5,568,044 A | 10/1996 | Bittner |
| 5,574,335 A | 11/1996 | Sun |
| 5,574,356 A | 11/1996 | Parker |
| 5,602,464 A | 2/1997 | Linkowsky et al. |
| 5,608,312 A | 3/1997 | Wallace |
| 5,612,594 A | 3/1997 | Maheshwari |
| 5,612,595 A | 3/1997 | Maheshwari |
| 5,615,093 A | 3/1997 | Nalbant |
| 5,619,104 A | 4/1997 | Eunghwa |
| 5,619,402 A | 4/1997 | Liu |
| 5,621,281 A | 4/1997 | Kawabata et al. |
| 5,629,588 A | 5/1997 | Oda et al. |
| 5,635,799 A | 6/1997 | Hesterman |
| 5,652,479 A | 7/1997 | LoCascio et al. |
| 5,663,613 A | 9/1997 | Yamashita et al. |
| 5,705,877 A | 1/1998 | Shimada |
| 5,710,489 A | 1/1998 | Nilssen |
| 5,712,533 A | 1/1998 | Corti |
| 5,712,776 A | 1/1998 | Palara et al. |
| 5,719,474 A | 2/1998 | Vitello |
| 5,724,237 A | 3/1998 | Hunter |
| 5,744,915 A | 4/1998 | Nilssen |
| 5,748,460 A | 5/1998 | Ishikawa |
| 5,751,115 A | 5/1998 | Jayaraman et al. |
| 5,751,120 A | 5/1998 | Zeitler et al. |
| 5,751,150 A | 5/1998 | Rippel et al. |
| 5,751,560 A | 5/1998 | Yokoyama |
| 5,754,012 A | 5/1998 | LoCascio et al. |
| 5,754,013 A | 5/1998 | Praiswater |
| 5,760,760 A | 6/1998 | Helms |
| 5,770,925 A | 6/1998 | Konopka et al. |
| 5,777,439 A | 7/1998 | Hua |
| 5,786,801 A | 7/1998 | Ichise |
| 5,796,213 A | 8/1998 | Kawasaki |
| 5,808,422 A | 9/1998 | Venkitasubrahmanian et al. |
| 5,818,172 A | 10/1998 | Lee |
| 5,822,201 A | 10/1998 | Kijima |
| 5,825,133 A | 10/1998 | Conway |
| 5,828,156 A | 10/1998 | Roberts |
| 5,834,925 A | 11/1998 | Chesavage |

| | | | | | | |
|---|---|---|---|---|---|---|
| 5,844,540 | A | 12/1998 | Terasaki | 6,292,378 B1 | 9/2001 | Brooks et al. |
| 5,854,617 | A | 12/1998 | Lee et al. | 6,294,883 B1 | 9/2001 | Weindorf |
| 5,859,489 | A | 1/1999 | Shimada | 6,307,356 B1 | 10/2001 | Dwelley |
| 5,872,429 | A | 2/1999 | Xia et al. | 6,307,765 B1 | 10/2001 | Choi |
| 5,875,104 | A | 2/1999 | Prager | 6,310,444 B1 | 10/2001 | Chang |
| 5,880,946 | A | 3/1999 | Biegel | 6,313,586 B1 | 11/2001 | Yamamoto et al. |
| 5,883,473 | A | 3/1999 | Li et al. | 6,316,881 B1 | 11/2001 | Shannon et al. |
| 5,883,797 | A | 3/1999 | Amaro et al. | 6,316,887 B1 | 11/2001 | Ribarich et al. |
| 5,886,477 | A | 3/1999 | Honbo et al. | 6,317,347 B1 | 11/2001 | Weng |
| 5,892,336 | A | 4/1999 | Lin et al. | 6,320,329 B1 | 11/2001 | Wacyk |
| 5,901,176 | A | 5/1999 | Lewison | 6,323,602 B1 | 11/2001 | De Groot et al. |
| 5,903,138 | A | 5/1999 | Hwang et al. | 6,331,755 B1 | 12/2001 | Ribarich et al. |
| 5,910,709 | A | 6/1999 | Stevanovic et al. | 6,340,870 B1 | 1/2002 | Yamashita et al. |
| 5,910,713 | A | 6/1999 | Nishi et al. | 6,344,699 B1 | 2/2002 | Rimmer |
| 5,912,812 | A | 6/1999 | Moriarty, Jr. | 6,346,798 B1 | 2/2002 | Passoni et al. |
| 5,914,842 | A | 6/1999 | Sievers | 6,351,080 B1 | 2/2002 | Birk et al. |
| 5,923,129 | A | 7/1999 | Henry | RE37,609 E | 3/2002 | Bittner |
| 5,923,546 | A | 7/1999 | Shimada et al. | 6,356,035 B1 | 3/2002 | Weng |
| 5,925,988 | A | 7/1999 | Grave et al. | 6,359,393 B1 | 3/2002 | Brown |
| 5,930,121 | A | 7/1999 | Henry | 6,362,577 B1 | 3/2002 | Ito et al. |
| 5,930,126 | A | 7/1999 | Griffin et al. | 6,362,608 B1 | 3/2002 | Ashburn et al. |
| 5,936,360 | A | 8/1999 | Kaneko | 6,388,388 B1 | 5/2002 | Weindorf et al. |
| 5,939,830 | A | 8/1999 | Praiswater | 6,396,217 B1 | 5/2002 | Weindorf |
| 5,945,815 | A | 8/1999 | Elliott | 6,396,722 B2 | 5/2002 | Lin |
| 5,973,368 | A | 10/1999 | Pearce et al. | 6,417,631 B1 | 7/2002 | Chen et al. |
| 5,973,485 | A | 10/1999 | Kates et al. | 6,420,839 B1 | 7/2002 | Chiang et al. |
| 6,002,210 | A | 12/1999 | Nilssen | 6,424,100 B1 | 7/2002 | Kominami et al. |
| 6,011,360 | A | 1/2000 | Gradzki et al. | 6,429,839 B1 | 8/2002 | Sakamoto |
| 6,016,245 | A | 1/2000 | Ross | 6,433,492 B1 | 8/2002 | Buonavita |
| 6,020,688 | A | 2/2000 | Moisin | 6,441,943 B1 | 8/2002 | Roberts et al. |
| 6,028,400 | A | 2/2000 | Pol et al. | 6,445,141 B1 | 9/2002 | Kastner et al. |
| 6,037,720 | A | 3/2000 | Wong et al. | 6,452,344 B1 | 9/2002 | MacAdam et al. |
| 6,038,149 | A | 3/2000 | Hiraoka et al. | 6,459,215 B1 | 10/2002 | Nerone et al. |
| 6,040,661 | A | 3/2000 | Bogdan | 6,459,216 B1 | 10/2002 | Tsai |
| 6,040,662 | A | 3/2000 | Asayama | 6,469,922 B2 | 10/2002 | Choi |
| 6,043,609 | A | 3/2000 | George et al. | 6,472,827 B1 | 10/2002 | Nilssen |
| 6,049,177 | A | 4/2000 | Felper | 6,472,876 B1 | 10/2002 | Notohamiprodjo et al. |
| 6,069,448 | A | 5/2000 | Yeh | 6,479,810 B1 | 11/2002 | Weindorf |
| 6,072,282 | A | 6/2000 | Adamson | 6,483,245 B1 | 11/2002 | Weindorf |
| 6,091,209 | A | 7/2000 | Hilgers | 6,486,618 B1 | 11/2002 | Li |
| 6,104,146 | A | 8/2000 | Chou et al. | 6,494,587 B1 | 12/2002 | Shaw et al. |
| 6,108,215 | A | 8/2000 | Kates et al. | 6,495,972 B1 | 12/2002 | Okamoto et al. |
| 6,111,370 | A | 8/2000 | Parra | 6,501,234 B2 | 12/2002 | Lin et al. |
| 6,114,814 | A | 9/2000 | Shannon et al. | 6,507,286 B2 | 1/2003 | Weindorf et al. |
| 6,121,733 | A | 9/2000 | Nilssen | 6,509,696 B2 | 1/2003 | Bruning et al. |
| 6,127,785 | A | 10/2000 | Williams | 6,515,427 B2 | 2/2003 | Oura et al. |
| 6,127,786 | A | 10/2000 | Moisin | 6,515,881 B2 | 2/2003 | Chou et al. |
| 6,137,240 | A | 10/2000 | Bogdan | 6,521,879 B2 | 2/2003 | Rand et al. |
| 6,144,194 | A | 11/2000 | Varga | 6,522,558 B2 | 2/2003 | Henry |
| 6,150,772 | A | 11/2000 | Crane | 6,531,831 B2 | 3/2003 | Chou et al. |
| 6,157,143 | A | 12/2000 | Bigio et al. | 6,534,934 B1 | 3/2003 | Lin et al. |
| 6,160,362 | A | 12/2000 | Shone et al. | 6,559,606 B1 | 5/2003 | Chou et al. |
| 6,166,528 | A | 12/2000 | Rossetti et al. | 6,563,479 B2 | 5/2003 | Weindorf et al. |
| 6,169,375 | B1 | 1/2001 | Moisin | 6,570,344 B2 | 5/2003 | Lin |
| 6,172,468 | B1 | 1/2001 | Hollander | 6,570,347 B2 | 5/2003 | Kastner |
| 6,181,066 | B1 | 1/2001 | Adamson | 6,583,587 B2 | 6/2003 | Ito et al. |
| 6,181,083 | B1 | 1/2001 | Moisin | 6,593,703 B2 | 7/2003 | Sun |
| 6,181,084 | B1 | 1/2001 | Lau | 6,628,093 B2 | 9/2003 | Stevens |
| 6,188,183 | B1 | 2/2001 | Greenwood et al. | 6,630,797 B2 | 10/2003 | Qian et al. |
| 6,188,553 | B1 | 2/2001 | Moisin | 6,633,138 B2 | 10/2003 | Shannon et al. |
| 6,194,841 | B1 | 2/2001 | Takahashi et al. | 6,642,674 B2 | 11/2003 | Liao et al. |
| 6,198,234 | B1 | 3/2001 | Henry | 6,650,514 B2 | 11/2003 | Schmitt |
| 6,198,236 | B1 | 3/2001 | O'Neill | 6,654,268 B2 | 11/2003 | Choi |
| 6,198,238 | B1 | 3/2001 | Edelson | 6,664,744 B2 | 12/2003 | Dietz |
| 6,211,625 | B1 | 4/2001 | Nilssen | 6,680,834 B2 | 1/2004 | Williams |
| 6,215,256 | B1 | 4/2001 | Ju | 6,703,998 B1 | 3/2004 | Kabel et al. |
| 6,218,788 | B1 | 4/2001 | Chen et al. | 6,707,264 B2 | 3/2004 | Lin et al. |
| 6,229,271 | B1 | 5/2001 | Liu | 6,710,555 B1 | 3/2004 | Terada et al. |
| 6,239,558 | B1 | 5/2001 | Fujimura et al. | 6,717,372 B2 | 4/2004 | Lin et al. |
| 6,252,355 | B1 | 6/2001 | Meldrum et al. | 6,717,375 B2 | 4/2004 | Noguchi et al. |
| 6,255,784 | B1 | 7/2001 | Weindorf | 6,724,602 B2 | 4/2004 | Giannopoulos |
| 6,259,215 | B1 | 7/2001 | Roman | 6,765,354 B2 | 7/2004 | Klien |
| 6,259,615 | B1 | 7/2001 | Lin | 6,781,325 B2 | 8/2004 | Lee |
| 6,262,566 | B1 | 7/2001 | Dinh | 6,784,627 B2 | 8/2004 | Suzuki et al. |
| 6,278,263 | B1 | 8/2001 | Walters et al. | 6,803,901 B1 | 10/2004 | Numao |
| 6,281,636 | B1 | 8/2001 | Okutsu et al. | 6,804,129 B2 | 10/2004 | Lin |
| 6,281,638 | B1 | 8/2001 | Moisin | 6,809,718 B2 | 10/2004 | Wei et al. |
| 6,285,571 | B1 | 9/2001 | Brooks et al. | 6,809,938 B2 | 10/2004 | Lin et al. |
| 6,291,946 | B1 | 9/2001 | Hinman | 6,815,906 B1 | 11/2004 | Aarons et al. |

| | | |
|---|---|---|
| 6,816,142 B2 | 11/2004 | Oda et al. |
| 6,856,099 B2 | 2/2005 | Chen et al. |
| 6,856,519 B2 | 2/2005 | Lin et al. |
| 6,864,867 B2 | 3/2005 | Biebl |
| 6,870,330 B2 | 3/2005 | Choi |
| 6,876,157 B2 | 4/2005 | Henry |
| 6,897,698 B1 | 5/2005 | Gheorghiu et al. |
| 6,900,599 B2 | 5/2005 | Ribarich |
| 6,900,600 B2 | 5/2005 | Rust et al. |
| 6,900,993 B2 | 5/2005 | Lin et al. |
| 6,922,023 B2 | 7/2005 | Hsu et al. |
| 6,930,893 B2 | 8/2005 | Vinciarelli |
| 6,936,975 B2 | 8/2005 | Lin et al. |
| 6,947,024 B2 | 9/2005 | Lee et al. |
| 6,967,449 B2 | 11/2005 | Ishihara |
| 6,967,657 B2 | 11/2005 | Lowles et al. |
| 6,969,958 B2 | 11/2005 | Henry |
| 6,979,959 B2 | 12/2005 | Henry |
| 7,005,835 B2 | 2/2006 | Brooks et al. |
| 7,026,860 B1 | 4/2006 | Gheorghiu et al. |
| 7,057,611 B2 | 6/2006 | Lin et al. |
| 7,075,245 B2 | 7/2006 | Liu |
| 7,095,392 B2 | 8/2006 | Lin |
| 7,112,929 B2 | 9/2006 | Chiou |
| 7,120,035 B2 | 10/2006 | Lin et al. |
| 7,151,394 B2 | 12/2006 | Gheorghiu et al. |
| 7,183,724 B2 | 2/2007 | Ball |
| 7,187,140 B2 | 3/2007 | Ball |
| 7,190,123 B2 | 3/2007 | Lee |
| 7,202,458 B2 | 4/2007 | Park |
| 7,233,117 B2 | 6/2007 | Wang et al. |
| 7,236,020 B1 | 6/2007 | Virgil |
| 7,279,852 B2 | 10/2007 | Henry |
| 7,411,360 B2 | 8/2008 | Henry |
| 7,569,998 B2 | 8/2009 | Henry |
| 7,646,152 B2 | 1/2010 | Chiou |
| 7,965,046 B2 | 6/2011 | Chiou |
| 2001/0036096 A1 | 11/2001 | Lin |
| 2002/0030451 A1 | 3/2002 | Moisin |
| 2002/0097004 A1 | 7/2002 | Chiang et al. |
| 2002/0114114 A1 | 8/2002 | Schmitt |
| 2002/0118182 A1 | 8/2002 | Weindorf |
| 2002/0130786 A1 | 9/2002 | Weindorf |
| 2002/0135319 A1 | 9/2002 | Bruning et al. |
| 2002/0140538 A1 | 10/2002 | Yer et al. |
| 2002/0145886 A1 | 10/2002 | Stevens |
| 2002/0153852 A1 | 10/2002 | Liao et al. |
| 2002/0171376 A1 | 11/2002 | Rust et al. |
| 2002/0180380 A1 | 12/2002 | Lin |
| 2002/0180572 A1 | 12/2002 | Kakehashi et al. |
| 2002/0181260 A1 | 12/2002 | Chou et al. |
| 2002/0195971 A1 | 12/2002 | Qian et al. |
| 2003/0001524 A1 | 1/2003 | Lin et al. |
| 2003/0020677 A1 | 1/2003 | Nakano |
| 2003/0025462 A1 | 2/2003 | Weindorf |
| 2003/0080695 A1 | 5/2003 | Ohsawa |
| 2003/0090913 A1 | 5/2003 | Che-Chen et al. |
| 2003/0117084 A1 | 6/2003 | Stack |
| 2003/0141829 A1 | 7/2003 | Yu |
| 2003/0161164 A1 | 8/2003 | Shannon et al. |
| 2003/0227435 A1 | 12/2003 | Hsieh |
| 2004/0000879 A1 | 1/2004 | Lee |
| 2004/0012556 A1 | 1/2004 | Yong et al. |
| 2004/0017348 A1 | 1/2004 | Numao |
| 2004/0032223 A1 | 2/2004 | Henry |
| 2004/0051473 A1 | 3/2004 | Jales et al. |
| 2004/0113569 A1 | 6/2004 | Henry |
| 2004/0145558 A1 | 7/2004 | Cheng |
| 2004/0155596 A1 | 8/2004 | Ushijima |
| 2004/0155853 A1 | 8/2004 | Lin |
| 2004/0189217 A1 | 9/2004 | Ishihara et al. |
| 2004/0257003 A1 | 12/2004 | Hsieh et al. |
| 2004/0263092 A1 | 12/2004 | Liu |
| 2005/0062436 A1 | 3/2005 | Jin |
| 2005/0093471 A1 | 5/2005 | Jin |
| 2005/0093472 A1 | 5/2005 | Jin |
| 2005/0093482 A1 | 5/2005 | Ball |
| 2005/0093483 A1 | 5/2005 | Ball |
| 2005/0093484 A1 | 5/2005 | Ball |
| 2005/0094372 A1 | 5/2005 | Lai |
| 2005/0099143 A1 | 5/2005 | Kohno |
| 2005/0156536 A1 | 7/2005 | Ball |
| 2005/0156539 A1 | 7/2005 | Ball |
| 2005/0156540 A1 | 7/2005 | Ball |
| 2005/0162098 A1 | 7/2005 | Ball |
| 2005/0218825 A1 | 10/2005 | Chiou |
| 2005/0225261 A1 | 10/2005 | Jin |
| 2006/0022612 A1 | 2/2006 | Henry |
| 2006/0049959 A1 | 3/2006 | Sanchez |
| 2006/0158136 A1 | 7/2006 | Chen |
| 2009/0273295 A1 | 11/2009 | Henry |

FOREIGN PATENT DOCUMENTS

| | | |
|---|---|---|
| EP | 0597661 | 5/1994 |
| EP | 0647021 | 9/1994 |
| JP | 06168791 | 6/1994 |
| JP | 8-204488 | 8/1996 |
| KR | 10-2003-0075461 | 10/2003 |
| TW | 520128 | 2/2003 |
| TW | 554643 | 9/2003 |
| TW | 8-204488 | 12/2003 |
| TW | 200501829 | 1/2005 |
| WO | WO 94/15444 | 7/1994 |
| WO | WO 98/09369 | 3/1998 |
| WO | WO 9941953 | 8/1999 |
| WO | WO 0237904 | 5/2002 |

OTHER PUBLICATIONS

Coles, Single Stage CCFL Backlight Resonant Inverter using PWM Dimming Methods, 1998, pp. 35-38.

Declaration of Charles Coles filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Dean G. Dunlavey filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Defendant/Counterclaimant Monolithic Power Systems, Inc.'s Expert Witness, Dr. Douglas C. Hopkins, In Support of Its Motion for Summary Judgment of Invalidity of Asserted Claims of U. S. Patent No. 6,198,234, dated Nov. 14, 2005.

Declaration of Doyle Slack filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Henry C. Su in Support of Plaintiff 02 Micro International Limited's Brief in Response to Third-Party Defendant Microsemi Corporation's Brief Re Claim Construction for U.S. Patent Nos. 5,930,121 and 6,198,234, dated Oct. 26, 2007.

Declaration of Irfan A. Lateef in Support of Third-Party Defendant Microsemi Corporation's Brief in Support of its Claim Construction for U.S. Patent Nos. 5,930,121 and 6,198,234, dated Oct. 19, 2007.

Declaration of John A. O'Connor filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Declaration of Robert Mammano filed by Defendant/Counterclaimant Monolithic Power Systems, Inc.'s In Support of Its Motion for Summary Judgment of Invalidity of Asserted Claims of U. S. Patent No. 6,198,234, dated Nov. 14, 2005.

Defendant/Counterclaimant Monolithic Power Systems, Inc.'s Memorandum of Points and Authorities in Support of Motion for Summary Judgment of Invalidity of Asserted Claims of U. S. Patent No. 5,615,093, dated Nov. 14, 2005.

Defendant/Counterclaimant Monolithic Power Systems, Inc.'s Memorandum of Points and Authorities in Support of Motion for Summary Judgment of Invalidity of Asserted Claims of U. S. Patent No. 6,198,234, dated Nov. 14, 2005.

Defendant/Counterclaimant Monolithic Power Systems, Inc.'s Notice of Motion and Motion for Summary Judgment of Invalidity of Asserted Claims of U.S. Patent No. 5,615,093, dated Nov. 14, 2005.

Defendant/Counterclaimant Monolithic Power Systems, Inc.'s Notice of Motion and Motion for Summary Judgment of Invalidity of Asserted Claims of U.S. Patent No. 6,198,234, dated Nov. 14, 2005.

Defendant/Counterclaimant Monolithic Power Systems, Inc.'s Reply Brief in Support of Motion for Summary Judgment of Invalidity of Asserted Claims of U.S. Patent No. 5,615,093, dated Mar. 13, 2006.

Defendant/Counterclaimant Monolithic. Power Systems, Inc.'s Reply Brief in Support of Motion for Summary Judgment of Invalidity of Asserted Claims of U.S. Patent No. 6,198,234, dated Mar. 13, 2006.

Dubey, G. K., "Thyristorised Power Controllers"; Halsted Press, 1986; pp. 74-77.

Goodenough, Frank, DC-to-AC Inverter Ups CCFL Lumens Per Watt, Electronic Design, Jul. 10, 1995, pp. 143-148.

IEEE Publication, "Dual Switched Mode Power Converter": Pallab Midya & Fred H. Schlereth; p. 155 1989.

IEEE Publication, "High Frequency Resonant Inverter for Group Dimming Control of Fluorescent Lamp Lighting Systems", K.H. Jee, et al., 1989 149-154.

Int. J. Electronics, "New soft-switching inverter for high efficiency electronic ballast with simple structure" E.C. Nho, et al., 1991, vol. 71, No. 3, 529-541.

Jordan et al., Resonant Fluorescent Lamp Converter Provides Efficient and Compact Solution, Mar. 1993, pp. 424-431.

Micro Linear, ML4878 Single-Stage CCFL Backlight Resonant Inverter, Application Note 68, May 1998, pp. 1-12.

Nguyen, Don J., "Optimizing Mobile Power Delivery". Presented at Intel Developers Forum, Fall 2001, p. 4.

O'Connor, J., Dimmable Cold-Cathode Fluorescent Lamp Ballast Design Using the UC3871, Application Note U-148, pp. 1-15,1995.

PCT International Search Report and Written Opinion mailed Apr. 8, 2008, Appl. No. PCT/US2007/072862 in 12 pages.

Plaintiff Microsemi Corporation's Opposition to Defendant/Counterclaimant Monolithic Power Systems, Inc.'s Motion for Summary Judgment of Invalidity of Asserted Claims of U.S. Patent No. 5,615,093, dated Feb. 13, 2006.

Plaintiff Microsemi Corporation's Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 5,615,093, dated Feb. 13, 2006.

Plaintiff Microsemi Corporation's Statement of Genuine Issues in Opposition to Defendant/Counterclaimant Monolithic Power Systems, Inc.'s Motion for Summary Judgment of Invalidity of Asserted Claims of U.S. Patent No. 6,198,234, dated Feb. 13, 2006.

Plaintiff O2 Micro International Limited's Brief in Response to Third-Party Defendant Microsemi Corporation's Brief Re Claim Construction for U.S. Patent Nos. 5,930,121 and 6,198,234, dated Oct. 26, 2007.

Plaintiff O2 Micro International Limited's Preliminary Invalidity Contentions re Third-Party Defendant Microsemi Corporation Patents, dated Sep. 14, 2007.

Supplemental Declaration of Dean G. Dunlavey filed by Defendant/Counterclaimant Monolithic Power Systems, Inc.'s in Support of Its Motion for Summary Judgment of Invalidity of Asserted Claims of U.S. Patent No. 6,198,234, dated Mar. 13, 2006.

Tannas, Lawrence, "Flat Panel Displays and CRTs". © 1985 Van Nostrand Reinhold Company Inc., pp. 96-99.

Third-Party Defendant Microsemi Corporation's Brief in Support of its Claim Construction for U.S. Patent Nos. 5,930,121 and 6,198,234, dated Oct. 19, 2007.

UNITRODE Datasheet, Resonant Fluorescent Lamp Driver, UC 1871/2871/3871, May 1993, pp. 1-6.

UNITRODE Datasheet, Resonant Fluorescent Lamp Driver, UC 1871/2871/3871, Oct. 1994, pp. 1-6.

UNITRODE Product & Applications Handbook 1993-94, U-141, Jun. 1993, pp. i-ii; 9-471-9-478.

Williams, B.W.; "Power Electronics Devices, Drivers, Applications and Passive Components"; Second Edition, McGraw-Hill, 1992; Chapter 10, pp. 218-249.

Williams, Jim, Techniques for 92% Efficient LCD Illumination, Linear Technology Application Note 55, Aug. 1993.

Search Report for Taiwan Patent Application No. 096124472. Jan. 16, 2012. 1 page.

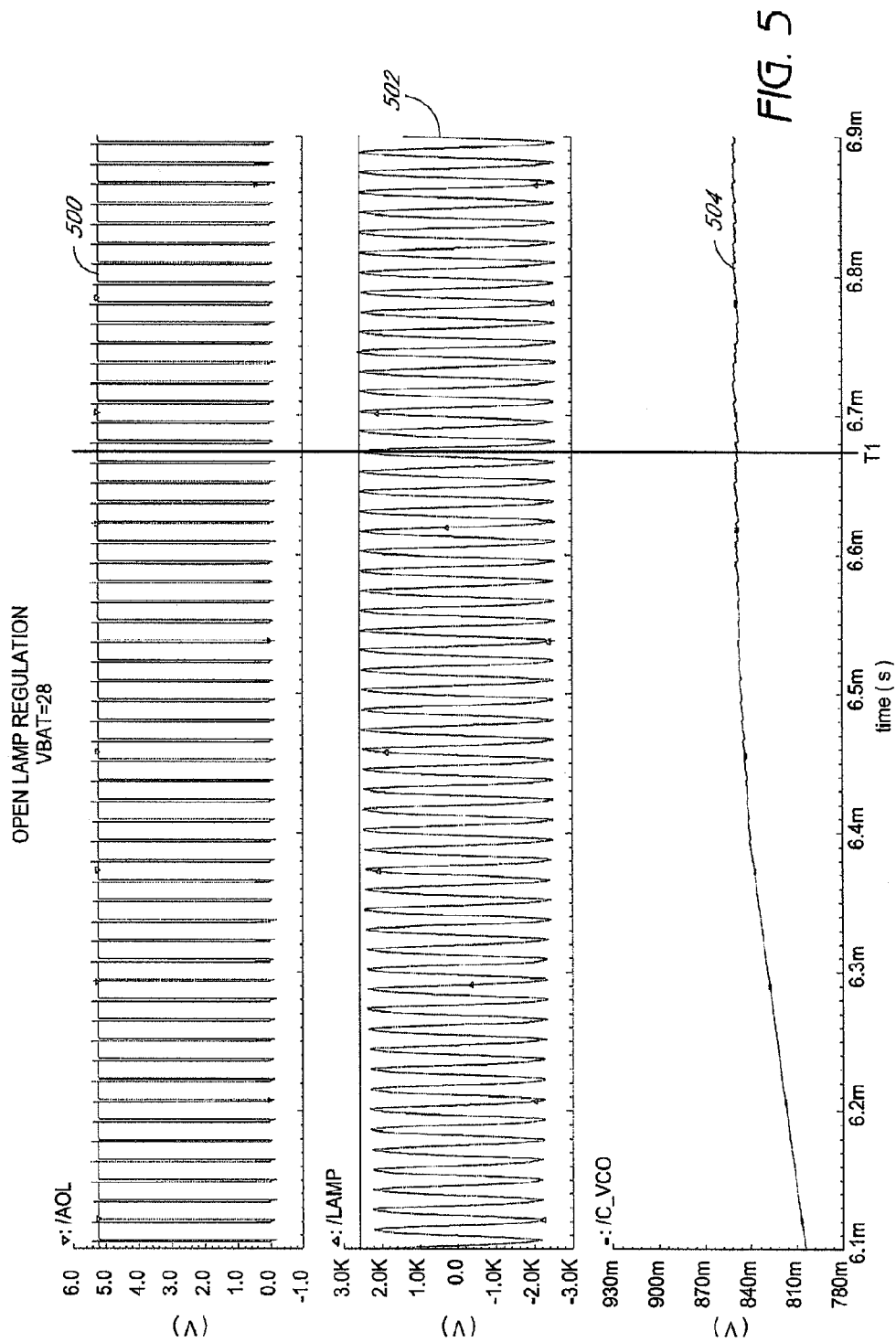

STRIKING AND OPEN LAMP REGULATION FOR CCFL CONTROLLER

PRIORITY CLAIMS

This application is a continuation of U.S. patent application Ser. No. 11/773,611, filed Jul. 5, 2007, entitled "Striking and Open Lamp Regulation for CCFL Controller"; and claims the benefit of priority under 35 U.S.C. §119(e) of U.S. Provisional Application No. 60/806,714, filed on Jul. 6, 2006 and entitled "Striking and Open Lamp Regulation for CCFL Controller"; U.S. Provisional Application No. 60/849,211, filed on Oct. 4, 2006 and entitled "Compensation for Supply Voltage Variations in a PWM"; and U.S. Provisional Application No. 60/849,254, filed on Oct. 4, 2006 and entitled "PWM Duty Cycle Inverse Adjustment Circuit," each of which is incorporated herein in its entirety by reference.

BACKGROUND OF THE INVENTION

1. Field of the Invention

This invention relates to inverter controllers for controlling power to fluorescent lamps and more particularly to an inverter controller with reliable lamp ignition and open lamp voltage regulation.

2. Description of the Related Art

Fluorescent lamps are used in a number of applications where light is required but the power required to generate the light is limited. One particular type of fluorescent lamp is a cold cathode fluorescent lamp (CCFL). CCFLs are used for back lighting or edge lighting of liquid crystal displays (LCDs), which are typically used in notebook computers, web browsers, automotive and industrial instrumentations, and entertainment systems. Such fluorescent lamps require a high starting voltage (on the order of 700-1,600 volts) for a short period of time to ionize the gas contained within the lamp tubes for ignition. After the gas in the CCFL is ionized and the CCFL is fired, less voltage is needed to keep the CCFL on.

A CCFL tube typically contains a gas, such as Argon, Xenon, or the like, along with a small amount of Mercury. After an initial ignition stage and the formation of plasma, current flows through the tube, which results in the generation of ultraviolet light. The ultraviolet light in turn strikes a phosphorescent material coated in the inner wall of the tube, resulting in visible light.

A power conversion circuit, known as an inverter, is generally used for driving the CCFL. The inverter accepts a direct current (DC) input voltage and provides an alternating current (AC) output voltage to the CCFL. The brightness (or the light intensity) of the CCFL is controlled by controlling the current (i.e., the lamp current) through the CCFL. For example, the lamp current can be amplitude modulated or pulse width modulated to control the brightness of the CCFL.

One type of inverter includes a resonant circuit. The inverter includes switching transistors in a half bridge topology or a full bridge topology using power metal-oxide-semiconductor-field-effect-transistors (MOSFETs) to provide the DC to AC conversion. Maximum power is provided at the output of the inverter by switching the MOSFETs with driving signals at a resonant frequency. To control the output voltage as well as the current through the lamp, the inverter can change the frequency of the driving signals either towards the resonant frequency or away from the resonant frequency.

SUMMARY OF THE INVENTION

One aspect of the present invention is an inverter with a closed feedback loop that sequentially controls a duty cycle sweep and a frequency sweep of at least one driving signal for igniting a lamp and regulating an open lamp voltage. In one embodiment, the closed feedback loop includes a detector circuit, a control voltage generator and two voltage converters. The detector circuit monitors an output voltage of the inverter and indicates when the output voltage of the inverter is greater than a predetermined threshold. The control voltage generator generates a control voltage signal that can vary from a first level to a second level at a predefined rate when the inverter enters a strike mode to ignite the lamp. The control voltage generator is coupled to an output of the detector circuit and the control voltage signal stops varying at the predefined rate when the output of the detector circuit indicates that the output voltage of the inverter is greater than the predetermined threshold. One voltage converter generates a first control output in response to a first range of values for the control voltage signal and another voltage converter generates a second control output in response to a second range of values in the control voltage signal. In one embodiment, the first range of values do not overlap with the second range of values for the control voltage signal so that the duty cycle sweep and the frequency sweep of the driving signal do not occur at the same time during an ignition attempt. In another embodiment, the duty cycle sweep and the frequency sweep partially overlap. The duty cycle sweep or the frequency sweep may be terminated to regulate the output voltage of the inverter at a desired open lamp voltage level. In addition, the strike mode ends when the lamp ignites (e.g., when the lamp conducts a current above a predetermined level) or when a time out condition occurs without ignition of the lamp.

In one embodiment, a method of igniting a lamp (e.g., a fluorescent lamp) includes sequentially controlling a duty cycle sweep and a frequency sweep in a pulse width modulation (PWM) controller to provide an increasing output voltage to the lamp. For example, the method controls both parameters (duty cycle and frequency) in a novel manner for lamp ignition and open lamp voltage regulation. The method allows for seamless operation of ignition and open lamp voltage regulation schemes during a strike mode of the PWM controller.

The method advantageously provides reliable lamp ignition and open lamp voltage regulation in applications that have variables (e.g., battery voltage, transformer parameters, lamp characteristics, printed circuit board parasitics, etc.) with wide operating ranges. In one embodiment, a lamp is coupled to a secondary winding of a transformer. The lamp strikes when a voltage across the secondary winding (e.g., secondary voltage or lamp voltage) is sufficiently high. In one embodiment, the secondary voltage is dependent on three parameters: duty cycle of signals (e.g., switching signals) coupled to a primary winding of the transformer, frequency of the switching signals, and battery voltage applied to the primary winding.

The method also provides accurate (or improved) regulation of open lamp voltage (e.g., when lamp is missing during the strike mode). In one embodiment, the ignition scheme works in conjunction with the open lamp voltage regulation scheme. For example, if the lamp is not present or defective during the strike mode, the PWM controller regulates the secondary voltage to prevent damage to the secondary winding. The open lamp voltage regulation scheme advantageously controls (or limits) the secondary voltage to a window (or range) of secondary voltages that are sufficient to ignite a lamp without causing damage to the secondary winding. The open lamp voltage regulation scheme reduces overshoot in the secondary voltage and regulates the secondary voltage over a wide range of variables. For example, the open lamp peak voltage regulation is specified to be within five percent in one embodiment.

In one embodiment, the invention is used in notebook or laptop computer backlighting applications in which duty cycle and frequency vary over a wide range for lamp ignition and open lamp voltage regulation. The invention also applies to television, automotive and other applications that use backlighting for visual displays. The invention advantageously controls both duty cycle and frequency in a stable closed feedback loop (e.g., with minimal overshoot in the secondary voltage). A combination of duty cycle control and frequency control provides flexibility to generate a secondary voltage sufficient to strike the lamp without exceeding a maximum rating of the secondary winding in applications with different lamps, transformers, printed circuit board layouts, battery voltages, etc. For example, the invention ensures that a striking frequency is not too low or too high, a duty cycle is not too low for relatively lower battery voltages or too high for relatively higher battery voltages, or open lamp voltage does not exceed secondary voltage ratings.

In one embodiment, a cold cathode fluorescent lamp (CCFL) controller is interfaced to a primary winding of a transformer to control power to a CCFL coupled to a secondary winding of the transformer. The CCFL controller controls a set of switches (e.g., by alternately turning on and off semiconductor switches) to generate an alternating current (AC) signal in the primary winding with a frequency and duty cycle determined by the CCFL controller. In one embodiment, a transformer primary to secondary turns ratio is chosen to increase a voltage across the secondary winding. The secondary winding is part of a high Q, resonant circuit comprising the secondary winding's parasitic inductance along with resistors, capacitors, and other parasitics coupled to the secondary winding.

The secondary peak voltage is a parameter of interest for lamp ignition and open lamp voltage regulation. The secondary voltage is relatively high (e.g., 1.5 Kilo-volts) to ignite the CCFL. The secondary voltage is dependent on applied battery voltage, duty cycle and frequency. Since the secondary winding is part of the high Q, resonant circuit (or secondary tank circuit) that has steep skirts, the secondary voltage may change rapidly in response to frequency or duty cycle changes near the resonant frequency. The resonant frequency may vary considerably due to different lamp characteristics and printed circuit board parasitics.

In one embodiment, a square wave switching signal (or driving signal) is used to generate the AC signal in the primary winding. The square wave switching signal is comprised of odd harmonic frequencies with magnitude ratios determined by the square wave switching signal's duty cycle. Energy in each pulse of the square wave switching signal is distributed to the harmonic frequencies. A square wave switching signal with narrow pulses results in a secondary voltage with relatively narrow peaks of high voltage. A square wave switching signal with wider pulses results in a secondary voltage that has a wider, more sinusoidal shape with relatively lower peak amplitudes. There is a diminishing increase in the peak amplitudes of the secondary voltage as the duty cycle (or pulse width) of the square wave switching signal increases further.

In one embodiment of the invention, a controller changes the duty cycle of a driving signal during a first stage of a strike mode and changes the frequency of the driving signal during a second stage of the strike mode to ignite a CCFL. The adjustment of the duty cycle (e.g., from a minimum to a maximum duty cycle) followed by adjustment of the frequency (e.g., from a lower frequency to a higher frequency), as needed, has many advantages. First, closed loop regulation (e.g., open lamp voltage regulation) is easier to control and compensate since the initial stage of changing (or sweeping) the duty cycle does not change the closed loop gain. Second, loop stability improves by maximizing the secondary voltage at the lower frequency which is achieved by sweeping the duty cycle to a maximum duty cycle before sweeping the frequency. As the frequency increases toward a resonant frequency, the closed loop gain changes rapidly. The closed loop gain does not change dramatically at lower frequencies away from the resonant frequency. Thus, maximizing the secondary voltage at a low frequency provides loop stability which leads to a more stable open lamp voltage regulation. Third, sweeping the duty cycle first is helpful in applications with relatively high battery voltages in which a relatively lower duty cycle is sufficient to strike the CCFL and a relatively high duty cycle may cause the secondary voltage to exceed a specification for a maximum open lamp voltage. Fourth, transformer saturation (in which the primary winding appears as a short circuit) can be avoided by sweeping the duty cycle from the minimum to the maximum duty cycle. This method of duty cycle sweeping allows the CCFL to safely ignite at a relatively lower duty cycle before reaching transformer saturation. Transformer saturation depends on a product of the battery voltage and the driving signal pulse width.

In another embodiment of the invention, a controller changes the frequency of a driving signal during a first stage of a strike mode and changes the duty cycle of the driving signal during a second stage of the strike mode to ignite a CCFL. The sequence of sweeping the frequency first and then sweeping the duty cycle also has advantages. For example, a transformer is capable of more power transfer at relatively higher frequencies. In some applications using an under-designed transformer, the transformer may saturate when operating at a relatively low frequency and a high duty cycle. Thus, one striking sequence sweeps the driving signal from a relatively low frequency to a relatively high frequency at a relatively low duty cycle first and then, as needed, sweeps the driving signal from the relatively low duty cycle to a relatively high duty cycle at the relatively high frequency. Starting with a low, but fixed, duty cycle driving signal and sweeping the frequency of the driving signal first is a safer way to prevent transformer saturation since higher frequency operation reduces the danger of saturation, especially in applications without feed forward circuits that limit duty cycle as a function of the battery voltage.

For the purpose of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 5 provides an expanded view of the waveforms shown in FIG. 4.

DETAILED DESCRIPTION

Figure 1:
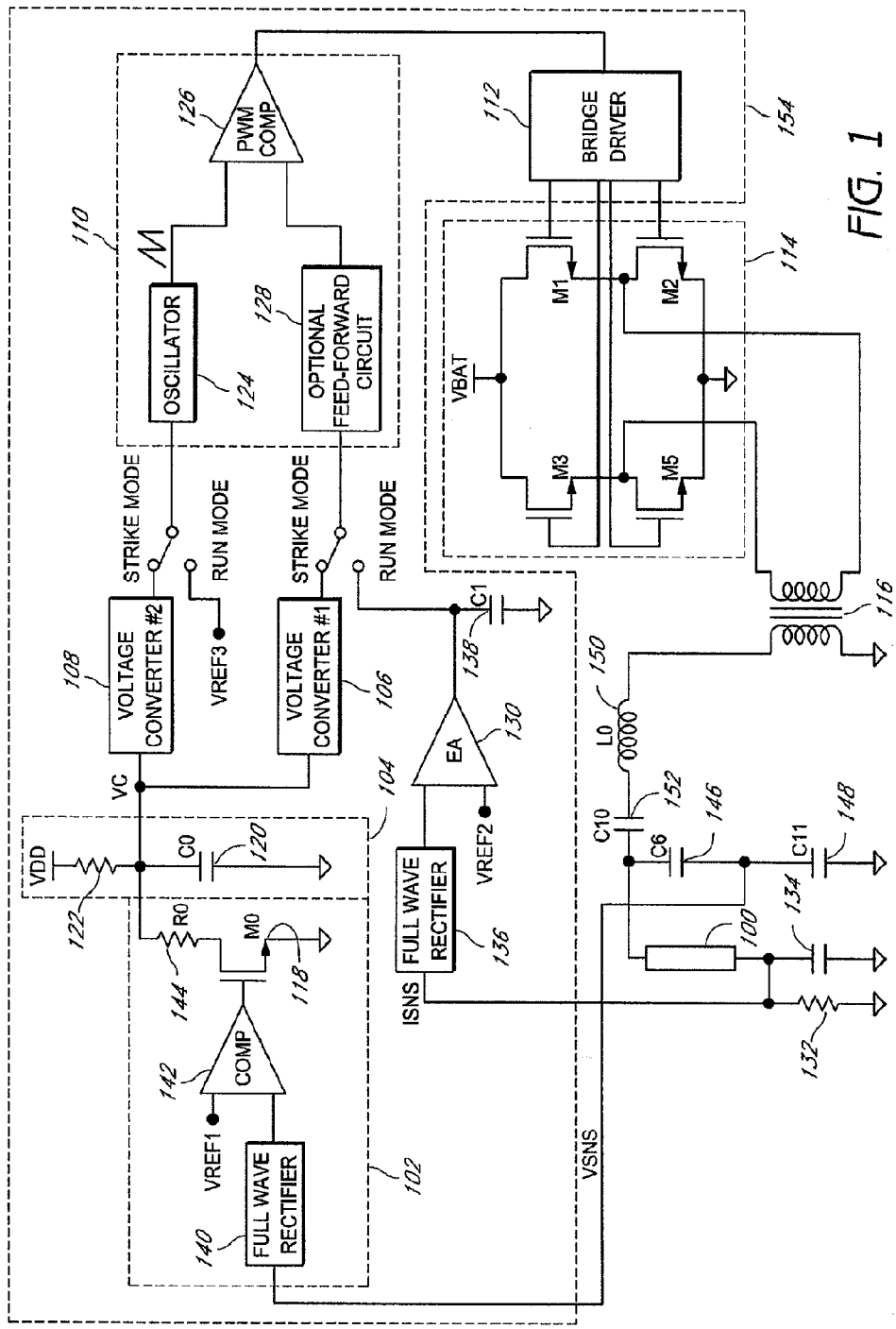
FIG. 1 is a block diagram of an inverter for powering a fluorescent lamp according to one embodiment of the present invention.

Further descriptions of several embodiments of the invention will be described hereinafter with reference to the drawings. FIG. 1 illustrates a circuit block diagram of one embodiment of an inverter for powering a lamp (e.g., a CCFL) 100. The inverter comprises a closed feedback loop that seamlessly controls ignition of the lamp 100 and provides open lamp voltage regulation during a strike mode of the inverter. In one embodiment, the closed feedback loop comprises a voltage detector circuit 102, a control voltage generator 104, a first voltage converter 106, and a second voltage converter 108.

For example, the voltage detector circuit 102 receives a first feedback signal (VSNS) indicative of an output voltage (or a voltage across the lamp 100) and generates an output indicating when the output voltage is greater than a predetermined voltage level corresponding to a first reference voltage (VREF1). The control voltage generator 104 generates a control voltage (VC) that can vary at a first predefined rate (e.g., from a first level to a second level) until an output of the voltage detector circuit 102 indicates that the voltage across the lamp is greater than the predetermined voltage level (e.g., when VSNS is greater than VREF1). The voltage detector circuit 102 stops the control voltage generator 104 from varying at the first predefined rate and adjusts the control voltage in response to the first feedback signal so as to regulate the output voltage of the inverter at approximately the predetermined voltage level. For example, the control voltage can be adjusted by being reduced at a second predefined rate when the first feedback signal exceeds the first reference voltage (e.g., a partial discharge of capacitor 120 through resistor 144). Thus, if the lamp 100 is not present during the strike mode, the output voltage is regulated at approximately the predetermined voltage level to prevent damage to inverter components (e.g., a high voltage transformer).

The control voltage is provided to the first voltage converter 106 and the second voltage converter 108. The first voltage converter 106 responds to a first range of the control voltage to generate a first control output that determines duty cycles of driving signals during the strike mode. The second voltage converter 108 responds to a second range of the control voltage to generate a second control output that determines frequency of the driving signals during the strike mode. For example, the first control output and the second control output are selectively provided to a PWM circuit 110 during the strike mode to generate a PWM signal for controlling power to the lamp 100. In one embodiment, the PWM circuit 110 is implemented in a common controller integrated circuit 154 with the voltage detector circuit 102, the control voltage generator 104, the first voltage converter 106, and the second voltage converter 108

In one embodiment, the PWM signal is provided to a bridge driver 112 to generate a plurality of driving signals for controlling respective semiconductor switches in a switching network 114. The switching network 114 couples a supply voltage (e.g., a substantially DC source voltage or VBAT) in alternating polarity across a primary winding of a transformer 116 to generate a substantially AC voltage across a secondary winding of the transformer 116. The lamp 100 is coupled to the secondary winding of the transformer 116.

In the embodiment shown in FIG. 1, the switching network 114 is shown as a full-bridge switching networking comprising four transistors M1, M2, M3, M5. Other switching network topologies (e.g., half-bridge, push-pull, etc.) are also possible. In one embodiment, the secondary winding of the transformer 116 is coupled to the lamp 100 through a resonant inductor 150 and a DC blocking capacitor 152. The resonant inductor 150 can be a leakage inductance associated with the secondary winding and not a separate component. The resonant inductor 150 is part of a secondary resonant circuit that also comprises resistors, capacitors, and other parasitics (not shown) coupled to the secondary winding to establish a resonant frequency.

In one application, the control voltage (VC) has an initial state of zero volts at the beginning of a strike mode and increases at a predefined rate to a preset value (e.g., VDD or a supply voltage). The control voltage can be generated by many methods using different circuit topologies, and FIG. 1 shows one method of generating the control voltage. For example, a peak detector transistor (or NMOS transistor M0) 118 is initially off and a capacitor (C0) 120 is charged through a pull-up resistor 122 to produce the control voltage across the capacitor 120 at an exponential RC rate of change.

The control voltage is provided to input terminals (or input ports) of the first and second voltage converters 106, 108. In one embodiment, the voltage converters 106, 108 have limited and non-overlapping input ranges. For example, the first voltage converter (or voltage converter #1) 106 has a first limited input range (e.g., from 0-1 volt) while the second voltage converter (or voltage converter #2) 108 has a second limited input range (e.g., from 1-2 volts). The output of each voltage converter changes when the control voltage is within the respective limited input range.

Figure 2:
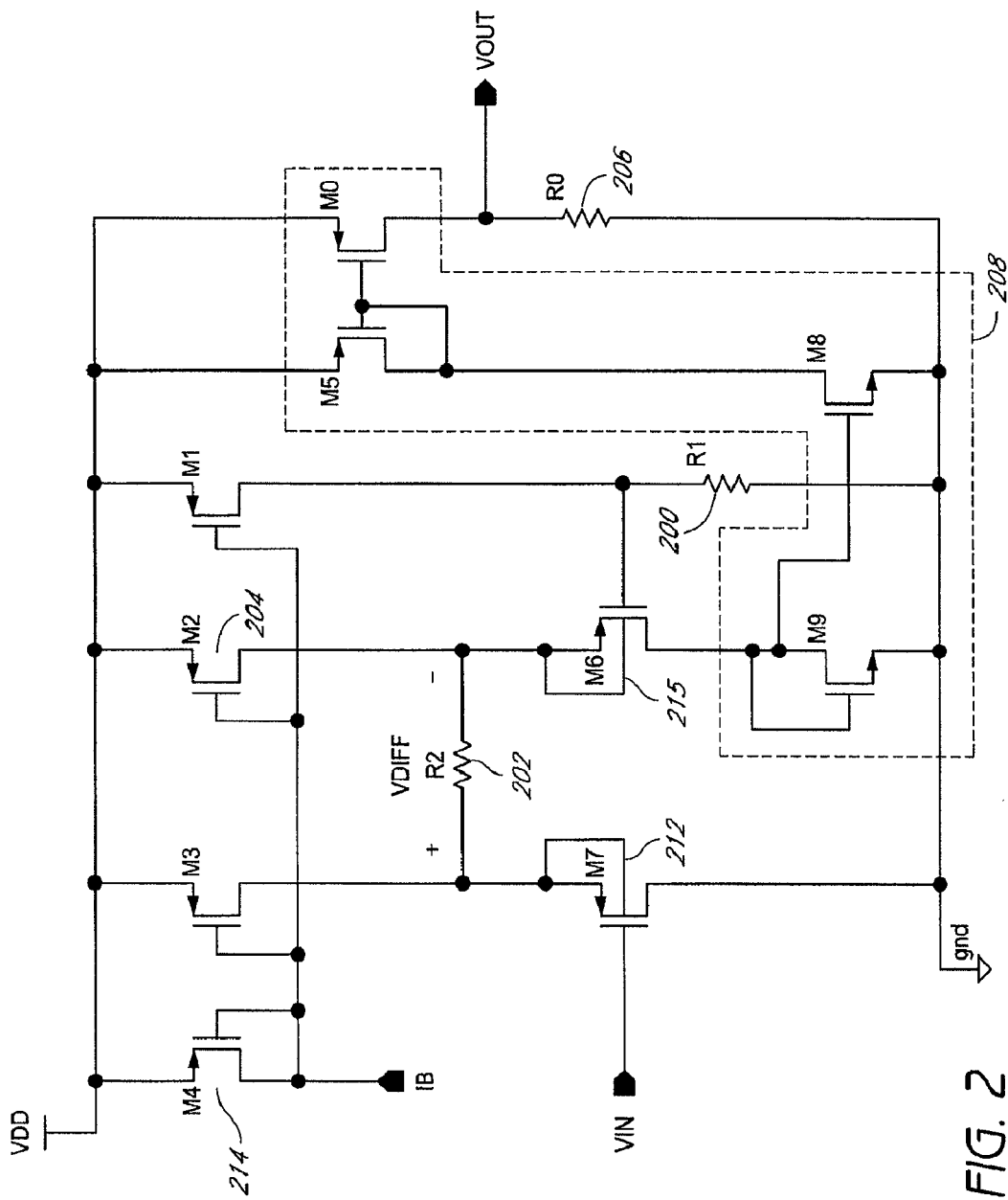
FIG. 2 is a circuit diagram of one embodiment of a voltage converter shown in FIG. 1.

FIG. 2 is a schematic diagram of one embodiment of a voltage converter. A reference voltage is generated across a first resistor (R1) 200. For example, the reference voltage is approximately 0.5 volt for the first voltage converter 106. The value of this reference voltage and a second resistor (R2) 202 can be chosen to determine (or limit) the input range of the voltage converter. The control voltage (VC) from FIG. 1 is provided to an input port (VIN). The reference voltage and the control voltage are level shifted by respective PMOS source followers (M6 and M7) 215, 212. A differential voltage (VDIFF) between an input voltage at the input port (VIN) and the reference voltage is seen across the second resistor (R2) 202. A current conducted by the second resistor (R2) 202 is added to or subtracted from a current conducted by a transistor M2 204. The transistor M2 204 conducts a current reference derived from a bandgap circuit comprising transistor M4 214. A sum of the current reference and the current conducted by the second resistor (R2) 202 is mirrored by a current-mirror circuit 208 comprising transistors M9, M8, M5 and M0 to produce an output voltage (VOUT) across an output resistor (R0) 206. The current mirror gain and the output resistor (R0) 206 can be used to scale and offset the differential voltage between the input voltage and the reference voltage across the first resistor 200. Specific details for the output portion of the voltage converter are dependent on circuits that will be coupled to the output voltage.

In the embodiment shown in FIG. 1, the outputs from the first voltage converter 106 and the second voltage converter 108 are selectively provided to first and second input terminals of the PWM circuit 110 during the strike mode. In one embodiment, the PWM circuit 110 comprises an oscillator 124, a PWM comparator 126 and an optional feed-forward circuit 128. The optional feed-forward circuit 128, if present, is coupled between the first input terminal of the PWM circuit 110 and a first input terminal of the PWM comparator 126. The voltage at the first input terminal of the PWM circuit 110 determines the pulse width (or duty cycle) of a PWM signal at an output terminal of the PWM comparator 126, which is also the output terminal of the PWM circuit 110. The oscillator 124 generates a sawtooth waveform for a second input terminal of the PWM comparator 126. The frequency of the sawtooth waveform is determined by the voltage at the second input terminal of the PWM circuit 110.

During steady state operations (or run mode), a substantially fixed reference voltage (VREF3) is selectively provided to the second input terminal of the PWM circuit 110 to establish a substantially constant operating frequency for the inverter. During the run mode, the first input terminal of the PWM circuit 110 is selectively coupled to a current feedback loop comprising an error amplifier 130. For example, the current feedback loop senses current conducted by the lamp 100 and generates a current feedback signal (ISNS) indicative of the lamp current level. In one embodiment, the current feedback signal is a voltage generated across a sensing resistor 132 coupled in series with the lamp 100. A capacitor 134 is optionally coupled in parallel with the sensing resistor 132 for filtering. The current feedback signal is provided to a full wave rectifier 136 to generate a substantially DC signal for a first input terminal of the error amplifier 130. A voltage (VREF2) indicative of desired lamp current amplitude is provided to a second input terminal of the error amplifier 130. In one embodiment, the error amplifier 130 is a transconductance amplifier and a capacitor (C1) 138 is coupled to an output terminal of the error amplifier 130 to generate an error voltage for the first input terminal of the PWM circuit 110 during the run mode. The error voltage is used to adjust the pulse width (or duty cycle) of the PWM signal at the output of the PWM circuit 110 to achieve the desired lamp current amplitude during the run mode.

In one embodiment, the first voltage converter 106 is configured to transfer a 0-1 volt input voltage into an output voltage that is within a trough and peak of the sawtooth waveform generated by the oscillator 124. For example, the sawtooth waveform may have a peak-to-peak voltage of 3 volts with a 1 volt trough (or offset) voltage. The output voltage of the first voltage converter 106 is provided as a reference voltage to the first input terminal of the PWM comparator 126. As the reference voltage at the first input terminal of the PWM comparator 126 changes, the duty cycle of the signal at the output terminal of the PWM comparator 126 changes (e.g., sweeps or changes without significant discontinuity). In the embodiment shown in FIG. 1, an optional feed-forward circuit 128 is shown between the output of the first voltage converter 106 and the first input terminal of PWM comparator 126. The optional feed-forward circuit 128 may make additional adjustments to the duty cycle of the signal at the output terminal of the PWM comparator 126 in response to supply voltage variations, as described further below.

In one embodiment, the second voltage converter 108 is configured to transfer a 1-2 volts input voltage from the control voltage (VC) into an output voltage that is used to sweep the frequency of the oscillator 124 from a starting frequency (e.g., a normal lamp running frequency) to several times (e.g., two times) the starting frequency. Other frequency sweeping ranges are also possible. Since the control voltage ramps starting from zero volt and the input range of the first voltage converter 106 is less than the input range of the second voltage converter 108, the output voltage of the first voltage converter 106 will vary (or sweep) before the output voltage of the second voltage converter 108.

In the embodiment described above, the input ranges for the voltage converters 106, 108 are chosen such that the output of the PWM comparator 126 sweeps in duty cycle first at a starting frequency and then sweeps in frequency at a predetermined (or maximum) duty cycle. Preferably, the duty cycle and the frequency sweep independently and do not interact simultaneously. In one embodiment, the predetermined duty cycle is limited by a feed-forward circuit that correlates duty cycle with applied battery voltage. For example, the feed-forward circuit adjusts the duty cycle to compensate for variations in the applied battery voltage. Details of some feed-forward circuits are disclosed in co-owned U.S. Provisional Application No. 60/849,211, filed on Oct. 4, 2006 and entitled "Compensation for Supply Voltage Variations in a PWM," and U.S. Provisional Application No. 60/849,254, filed on Oct. 4, 2006 and entitled "PWM Duty Cycle Inverse Adjustment Circuit," the disclosure of which is hereby incorporated by reference herein in its entirety.

In other embodiments, the input ranges of the voltage converters 106, 108 are chosen (or limited) such that the frequency sweep occurs before the duty cycle sweep. For example, the input voltage ranges for the voltage converters 106, 108 can be altered as described above with reference to FIG. 2 and the input voltage ranges discussed above can be reversed between the voltage converters 106, 108 such that the frequency sweep occurs first. The frequency sweep is more effective in striking the lamp 100 with relatively low battery voltages (e.g., about 7 volts) while the duty cycle sweep is more effective at striking the lamp 100 with relatively high battery voltages (e.g., about 20 volts). In yet another embodiment, the input voltage ranges of the voltage converters 106, 108 overlap to provide an overlap between the duty cycle sweep and the frequency sweep.

Figure 3:
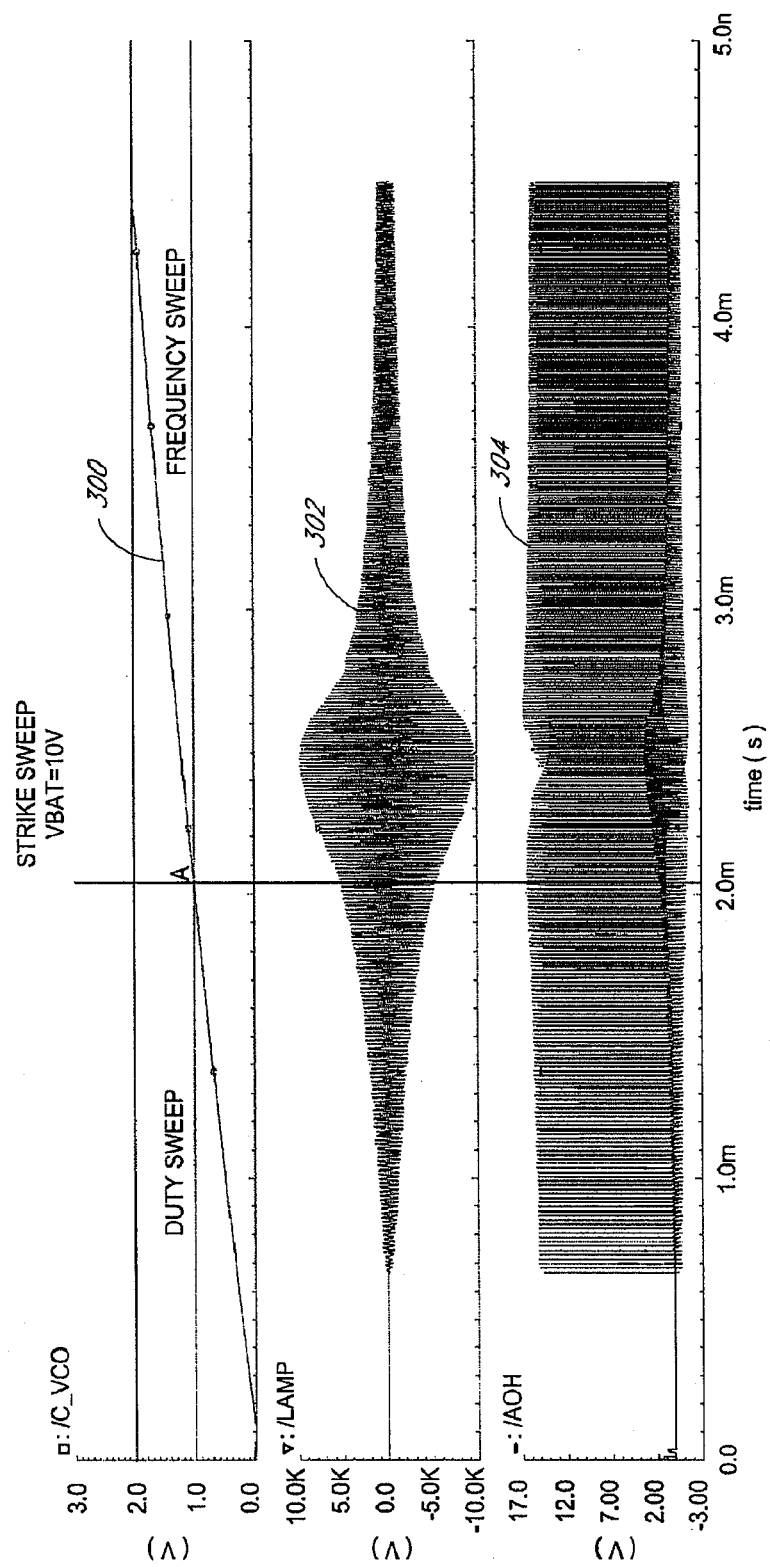
FIG. 3 illustrates various waveforms from a circuit simulation of the inverter.

FIG. 3 illustrates a simulation showing a control voltage 300, a secondary or lamp voltage 302 and a switching signal 304 with respect to time in an application with a 10 volts battery voltage. For example, as the control voltage 300 is ramping from approximately zero volt to approximately two volts, the duty cycles of the lamp voltage 302 and the switching signal 304 sweep first and then their frequencies sweep at a maximum duty cycle. The change from duty cycle sweep to frequency sweep is marked with a lined denoted "A." In a normal application, the control voltage 300 stops ramping and the sweeping stops when the lamp voltage 302 is sufficiently high to strike a lamp or exceeds a predetermined open lamp voltage corresponding to VREF1 in FIG. 1. In the simulation shown in FIG. 3, the control voltage is allowed to continue ramping to show how continued sweeping affects the lamp voltage 302. For example, the lamp voltage 302 increases with time initially due to increasing duty cycle of the switching signal 304 until a time marked by line A. Thereafter, the lamp voltage 302 continues to increase with time due to increasing frequency of the switching signal 304 until the frequency exceeds a resonant frequency associated with a secondary resonant tank circuit. The lamp voltage 302 begins to decrease when the frequency increases beyond the resonant frequency because the voltage gain of the secondary resonant tank circuit decreases as the frequency moves away from the resonant frequency.

Referring to FIG. 1, one embodiment of the voltage detector circuit 102 used to regulate open lamp voltage during the strike mode comprises a full wave rectifier 140, a comparator 142, the transistor M0 (e.g., NMOS) 118 and a resistor R0 144. A capacitor divider circuit comprising a capacitor C6 146 and a capacitor C11 148 is used to monitor a transformer secondary voltage and to generate a sensed voltage (e.g., the first feedback signal or VSNS) that is provided to an input terminal of the full wave rectifier 140. The comparator 142 compares an output of the full wave rectifier 140 with a reference VREF1. If the output of the full wave rectifier 140

(e.g., output peak voltage) exceeds the reference VREF1 (such as during an open lamp condition), the comparator will turn on the transistor M0 118 to adjust the control voltage such that the transformer secondary voltage is maintained (or regulated) at a predetermined open lamp voltage level (or amplitude). Thus, a combination of the transistor M0 118, the capacitor C0 120, the resistor R0 144 and the pull-up resistor 122 forms a peak detector circuit. In one embodiment, a ratio between the resistor R0 144 and the pull-up resistor 122 is chosen such that the capacitor C0 120 has a faster discharging rate and a slower charging rate.

Figure 4:
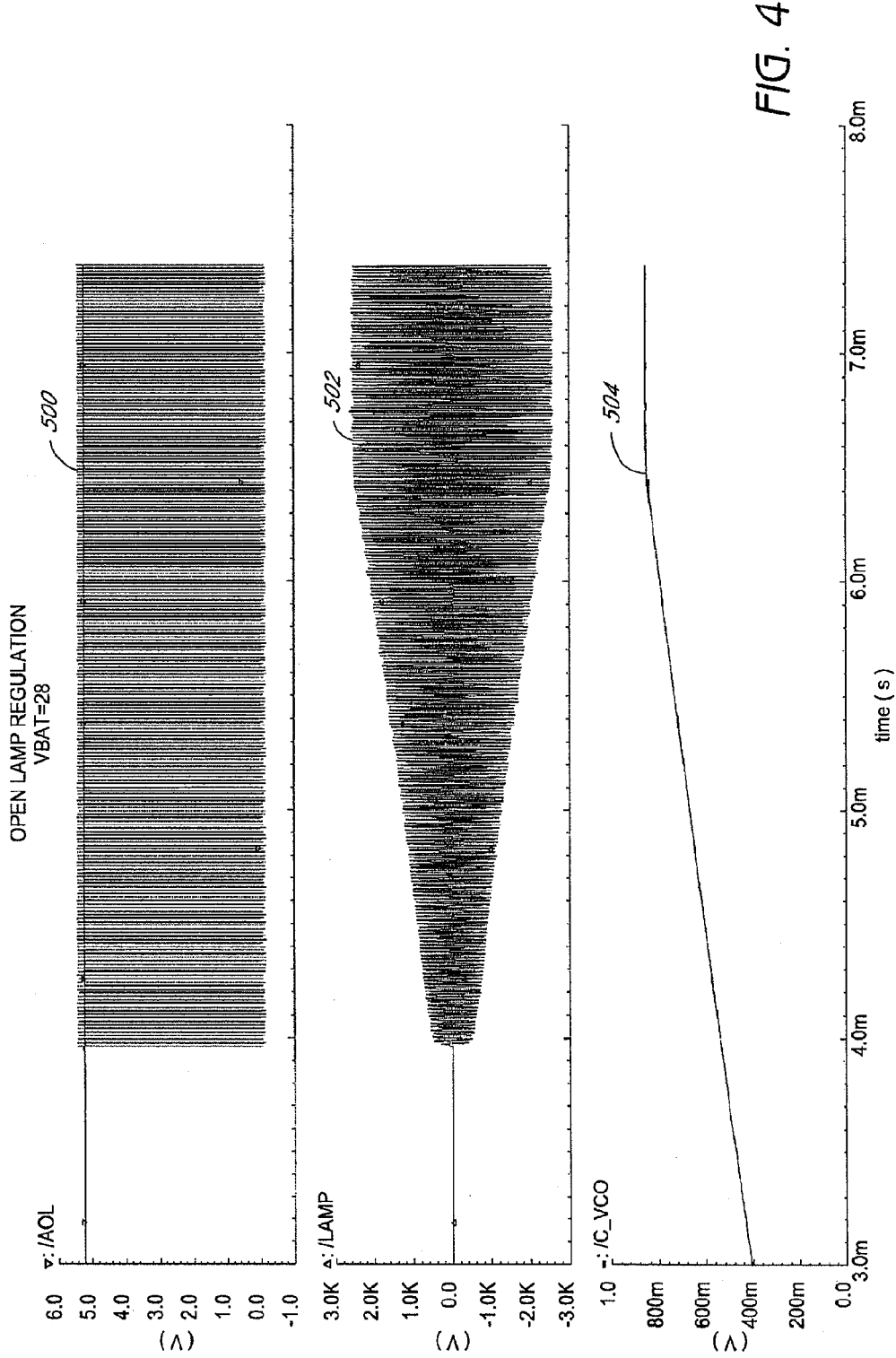
FIG. 4 illustrates various waveforms showing open lamp voltage regulation.

A closed feedback loop is formed since an output of the voltage detector circuit 102 is coupled to the control voltage that regulates ignition. The closed feedback loop regulates the transformer secondary voltage by adjusting the control voltage until the output of the full wave rectifier 140 is approximately equal to the reference voltage VREF1. FIG. 4 illustrates one example of the transformer secondary voltage (or open lamp voltage, e.g., voltage across the secondary winding of the transformer 116) as a function of time shown as waveform 502 in relationship to the control voltage as a function of time shown as waveform 504 and one of the driving signals applied to a semiconductor switch in the switching network 114 as a function of time shown as waveform 500. FIG. 5 illustrates in more detail a portion of FIG. 4 that confirms excellent regulation of the open lamp voltage. For example, at approximately time T1, the transformer secondary voltage reaches a predetermined level and the control voltage levels off (or stops increasing) to maintain the transformer secondary voltage at approximately the predetermined level.

In one embodiment, two single-pole-double-throw (SPDT) switches are used to toggle (or select) between strike and run modes in FIG. 1. For example, ignition of the lamp 100 can be detected to toggle from the strike mode to the run mode. In one embodiment, ignition is determined by monitoring when the current feedback signal (ISNS) exceeds a threshold. In the embodiment shown in FIG. 1, the output of the full wave rectifier 136 can be compared to the threshold voltage VREF2 or a separate voltage reference to determine ignition of the lamp 100. When the lamp 100 is considered lit, the SPDT switches toggle and latch to run mode positions. In the run mode positions, the oscillator 124 is coupled to a reference voltage VREF3 that sets the oscillator's frequency to a run mode frequency (e.g., the starting or the lowest strike mode frequency). An input of an optional feed forward circuit 128 is coupled to the output of the error amplifier 130 that regulates the lamp current amplitude once the lamp 100 is lit.

While certain embodiments of the invention have been described, these embodiments have been presented by way of example only, and are not intended to limit the scope of the inventions. Indeed, novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method of igniting an unlit lamp comprising:
generating a control voltage, wherein the control voltage has a first range of values for controlling duty cycle of driving signals that control power to the unlit lamp and a second range of values for controlling frequency of the driving signals; and
ramping the control voltage from a first level to a second level at a predefined rate to sequentially control a duty cycle sweep and a frequency sweep of the driving signals to provide an increasing output voltage to the unlit lamp while the output voltage across the unlit lamp is less than a predetermined level.

2. The method of claim 1, further comprising:
terminating the duty cycle sweep or the frequency sweep when a current feedback signal indicates that the lamp has ignited or when the output voltage across the lamp reaches a predetermined threshold; and
adjusting the control voltage with a voltage feedback signal indicative of the output voltage across the lamp to maintain the output voltage across the lamp at approximately the predetermined threshold if the lamp has not ignited after the output voltage across the lamp has reached the predetermined threshold.

3. The method of claim 1, wherein the first range of values does not overlap with the second range of values for the control voltage.

4. The method of claim 1, wherein the duty cycle sweep occurs before the frequency sweep of the driving signals.

5. The method of claim 1, wherein the frequency sweep occurs before the duty cycle sweep of the driving signals.

6. The method of claim 1, wherein the duty cycle of the driving signals changes from a relatively low level to a relatively high level during an initial ignition stage and the frequency of the driving signals changes from a relatively low frequency to a relatively high frequency during a subsequent ignition stage.

7. The method of claim 1, further comprising controlling a plurality of semiconductor switches with the driving signals to generate an AC signal in a primary winding of a transformer, wherein the lamp is coupled to a secondary winding of the transformer.

* * * * *